United States Patent Office 3,354,027
Patented Nov. 21, 1967

3,354,027
DEINKING OF WASTE PAPER
Shafi Ul Hossain and Antal Anthony Pataki, Sault Ste. Marie, Ontario, Canada, assignors to Abitibi Power & Paper Company, Limited, Sault Ste. Marie, Ontario, Canada, a corporation of Canada
No Drawing. Filed Dec. 9, 1963, Ser. No. 329,210
Claims priority, application Canada, Sept. 11, 1963, 884,272
3 Claims. (Cl. 162—5)

ABSTRACT OF THE DISCLOSURE

A process for deinking waste paper in which the waste paper is treated with an alkaline chemical agent such as sodium sulphite and a polymer whose repeating units possess the structure of a lactam or a substituted lactam such as polyvinyl pyrrolidone.

---

This invention relates to a process for deinking waste paper. One of the main problems in the reuse of waste paper such as newsprint is that of deinking the waste paper. Newspapers usually contain 1 to 2% of printing ink consisting largely of carbon black, petroleum oils and a suitable dye solution. The deinking operation may be divided into two stages, the first being the cooking or defibrating stage in which the ink particles are loosened from the fibre surface. The second stage is the ink removal stage in which the released ink particles are physically separated from the fibre slurry. This invention is particularly concerned with the first stage, that is to say, the cooking stage.

In our prior Canadian application No. 863,968 filed Dec. 7, 1962, it was explained that various alkalies had been used as the chemical agent in the cooking stage, including sodium hydroxide, sodium carbonate, sodium silicate and it was proposed that deinking be carried out instead with an alkali metal sulphite, preferably sodium sulphite.

It has now been found that improved results can be obtained by deinking with an alkaline chemical agent and a soluble polymer of the type described below. Although it is preferred that the alkaline chemical agent be sodium sulphite, other soluble alkaline chemical agents including sodium bisulphite, sodium tripolyphosphate, sodium pyrophosphate, sodium metasilicate, sodium hydroxide, sodium carbonate and sodium silicate can be used as the soluble alkaline chemical agent.

The term "soluble polymer" may be defined as a substance of high molecular weight which forms a solution or a dispersion in aqueous media approaching, in general, the characteristics of aqueous colloidal dispersions. The particular soluble polymers used in accordance with this invention are polyampholytes, and polymers whose repeating units possess the structure of a lactam or a substituted lactam. Polyampholytes may be defined as macromolecular substances, which in solution, contain both positive and negative charges in their molecular structure. The net charge on a polyampholyte macromolecule is usually governed by the pH of the medium of dispersion. Soluble proteins, as a class, are typical examples of polyampholytes.

A soluble polymer having a lactam structure can, under certain conditions, hydrolyze generating acidic and basic groups in the same molecule, thus conferring ampholytic characteristics on the molecule. Polyvinyl pyrrolidone is an example of a soluble polymer having a substituted lactam structure.

As a suggested mechanism for the physico-chemical process of deinking in accordance with this invention, it may be said that the dual electrical characteristics of polyampholytes are particularly suitable for exerting a polar attraction for the ink particles, while maintaining an overall repulsion for the cellulose fibres.

In accordance with this invention in its broadest aspect a process is provided for the deinking of waste papers in which the waste paper is pulped in a solution containing a soluble alkaline deinking agent and a soluble polymer selected from the group consisting of polyampholytes such as proteins, and polymers having a lactam or a substituted lactam structure.

In the experiments described in the examples, the pulping action was accomplished in a pulper sold under the trade name "Turboflex." The waste paper was the "Milwaukee Sentinel or the Toronto Star. The brightness of the reslushed unprinted sections of Milwaukee Sentinel was 57 and that of the reslushed printed sections 48. The experiments were conducted with 2.5 lb., 5 lb. and 7.5 lb. of paper depending on the consistency during pulping (2%, 4% and 6%, respectively). No attempt was made to discard sections printed with coloured inks, and their proportion in the furnish to the pulper, in general, closely corresponded to that in the original newspapers.

The newspaper sheets were torn into quarters by hand and placed in the pulper. The requisite quantities of the chemicals and water were then added, the temperature of the water being adjusted to a predetermined level, usually around 60° C. The pulping was carried out for a specified length of time, usually 10 min. Samples were then withdrawn in 80-g. (on a moisture-free basis) batches and floated for approximately 10 min. in a laboratory-model Denver flotation cell. (The cell used was characterized by the manufacturer as a laboratory-model "Sub A flotation machine.") The consistency during flotation was adjusted to approximately 1%. After flotation, the pulp slurry was drained, the fibre mat collected and its brightness determined on sheets made in accordance with standard T.A.P.P.I. procedure. The brightness readings were taken with an Elrepho brightness instrument at 457 mmu. (millimicrons) wavelength and reported to the nearest integer. In addition, reflectance measurements were often taken over the range 426 mmu. to 681 mmu. to establish the "colour reflectance curve" for the pulp.

The pulping was conducted with various alkalies such as sodium sulphite, sodium tripolyphosphate, sodium pyrophosphate and sodium metasilicate, in different amounts; the soluble polymers used included polyvinyl pyrrolidone, animal blood, casein, animal glue and "Protein Colloid 1-V." The amounts of the latter were varied between 0.2% and 1.0%, based on the weight of the waste paper. In certain experiments, the polymer was mixed with surfactants such as soap or Triton X–100 (a nonionic alkyl aryl polyether alcohol) and chelating agents such as Versenex-80. (The pentasodium salt of diethylenetriamine penta-acetic acid.) In each case the pulping was conducted at a pH of about 8.

In several instances the pulps were bleached. The bleaching was carried out after flotation at a consistency of 4%. For bleaching, the pH of the pulp was adjusted to approximately 5.5 by means of dilute sulphuric acid and the pulp placed in a polyethylene bag. The bleaching chemicals, usually 0.2% sodium hydrosulphite and 0.5% sodium tripolyphosphate (based on the moisture-free weight of the pulp), were then added, the bag closed, and after kneading for a minute or two for proper mixing, placed in a heating bath at 60° C. for 1 hour.

Example

The results obtained following the foregoing procedure are set forth below in Table I in which TPP is an abbreviation for sodium tripolyphosphate; PVP is an abbreviation for polyvinyl pyrrolidone, metso refers to sodium metasilicate, and Protein Colloid 1-V is basically a collagen based protein manufactured by extracting collagen and refining to ensure a uniform product. The molecular weight was about 10,000 and the isoelectric pH in the neighbourhood of 5. This particular product—Protein Colloid 1-V—was manufactured by Swift & Company, Chicago, Ill., U.S.A.

ment showed that the deinking technique with soluble polymers, as embodied in the present invention was effective with waste paper stored under extremely adverse weather conditions.

Colour curves were obtained and it appeared from these that the unbleached deinked pulps had higher reflectance values than the unprinted sections in the blue and part of the green region of the spectrum. It thus ap-

TABLE I

| No. | Type of Paper | Chemical System | Consistency during Pulping | Brightness |
|---|---|---|---|---|
| 1 | Milwaukee Sentinel | 3% Na₂SO₃ plus 0.5% TPP plus 1.0% PVP K-30 | 2 | 58 |
| 2 | do | 3% Na₂SO₃ plus 0.5% TPP plus 0.5% casein | 2 | 58 |
| 3 | do | 3% Na₂SO₃ plus 0.5% TPP plus 1.0% animal glue | 4 | 57 |
| 4 | do | 3% Na₂SO₃ plus 0.5% TPP plus 0.2% Protein Colloid 1-V | 2 | 57 |
| 5 | do | 3% Na₂SO₃ plus 0.5% TPP plus 0.5% Protein Colloid 1-V | 2 | 59 |
| 6 | do | 1% Na₂SO₃ plus 0.5% TPP plus 0.5% Protein Colloid 1-V | 2 | 57 |
| 7 | do | 3% Na₂SO₃ plus 0.5% TPP plus 0.5% Protein Colloid 1-V | 2 | 58 |
| 8 | do | 5% Na₂SO₃ plus 0.5% TPP plus 0.5% Protein Colloid 1-V | 2 | 58 |
| 9 | do | 10% Na₂SO₃ plus 0.5% TPP plus 0.5% Protein Colloid 1-V | 2 | 59 |
| 10 | do | 3% Na₂SO₃ plus 1% TPP plus 1.0% Protein Colloid 1-V | 4 | 58 |
| 11 | do | 3% Na₂SO₃ plus 0.2% TPP plus 0.1% Triton X-100 plus 0.5% Protein Colloid 1-V | 4 | 58 |
| 12 | do | 3% Na₂SO₃ plus 0.5% Protein Colloid 1-V | 2 | 57 |
| 13 | do | 3% Na₂SO₃ plus 0.2% Versenex-80 plus 0.5% Protein Colloid 1-V | 2 | 59 |
| 14 | do | 1% TPP plus 0.5% Protein Colloid 1-V | 2 | 56 |
| 15 | do | 1.5% TPP plus 0.5% Protein Colloid 1-V | 2 | 56 |
| 16 | do | 1% Na₄P₂O₇ plus 0.5% Protein Colloid 1-V | 2 | 56 |
| 17 | do | 0.2% METSO plus 0.5% Versenex-80 plus 0.5% Protein Colloid 1-V | 2 | 55 |
| 18 | do | 3% Na₂SO₃ plus 0.5% TPP plus 1% soap plus 0.2% Protein Colloid 1-V | 2 | 60 |
| 19 | do | 3% Na₂SO₃ plus 0.5% TPP plus 1% soap plus 0.2% PVP K-30 | 2 | 58 |
| 20 | do | 3% Na₂SO₃ plus 0.5% TPP plus 1% soap plus 0.2% casein | 2 | 59 |
| 21 | do | 3% Na₂SO₃ plus 0.5% TPP plus 0.5% Protein Colloid 1-V [1] | 2 | 57 |
| 22 | do | do.[2] | 2 | 56 |
| 23 | do | (a) 3% Na₂SO₃ plus 0.5% TPP plus 0.5% Protein Colloid 1-V<br>(b) Bleached (after floating) with 0.2% Na₂SO₄ plus 0.5% TPP | 2<br>4 | (a) 58<br>(b) 61 |
| 24 | Toronto Star[3] | 3% Na₂SO₃ plus 0.5% TPP plus 0.5% Protein Colloid 1-V | 2 | 60 |
| 25 | do.[4] | do | 2 | 56 |
| 26 | Milwaukee Sentinel | do | 2 | 58 |

[1] Protein Colloid added in the flotation cell.
[2] Pulped at a temp. between 6°–10° C. for 20 min.
[3] Less than a week old.
[4] 12 months old.

It will be noted from the experiments set forth in the above example that soluble polymers of the type disclosed were effective deinking agents when used with a suitable alkali system. The most suitable alkali system was found to be a combination of sodium sulphite with a small amount of sodium tripolyphosphate. When this alkali system was used with "Protein Colloid 1-V( Experiments Nos. 4–10) the brightness of the deinked pulps were actually 1 to 2 points higher than that of the corresponding unprinted edge sections. Experiment No. 25 was on a newspaper which had been aged for twelve months. The brightness of the unprinted edge sections of this paper had fallen to 55 but the deinked brightness was 56. This shows that a deinking system in accordance with this invention can successfully be used for deinking waste paper aged for a considerable period of time.

It is apparent that the amount of sodium sulphite or other alkaline deinking agent may be widely varied. Quantities in the range of 1 to 10% can be used but the preferred range is between 3 and 5%. Surfactants such as soap or chelating agents such as the pentasodium salt of diethylenetriamine penta-acetic acid are compatible with soluble polymers such as proteins or polyvinyl pyrrolidone. It will also be noted that the addition of the soluble polymers, may, as demonstrated in Experiment 21, be added at points other than the pulper, such as in the flotation cell. It was furthermore shown that the pulping temperature may be widely varied. Experiment No. 22 was performed with the water temperature at 6° C. at the beginning of pulping.

Experiment No. 26 was conducted on waste paper which was stored outside during the winter months (with temperatures often dropping below 0° F.). This experipeared that the deinking treatment in accordance with the invention enhanced the reflectance in the blue region at the expense of the reflectance in the yellow-red region, conferring on the deinked pulp a pleasing blue-white shade rather than merely restoring the yellow-white of the original stock.

We claim:
1. In a process for deinking waste paper the step of treating the waste paper in a solution containing a soluble alkaline deinking agent and polyvinyl pyrrolidone.
2. A process as in claim 1 in which the soluble alkaline deinking agent is sodium sulphite.
3. A process as in claim 2 in which the polyvinyl pyrrolidone is in the amount of 0.2 to 1% based on the weight of waste paper.

References Cited

UNITED STATES PATENTS

| 1,925,372 | 9/1933 | Darling | 162—5 |
| 1,991,823 | 2/1935 | Snyder | 162—5 |
| 2,186,609 | 1/1940 | Kress | 162—5 |
| 2,607,678 | 8/1952 | Scheid | 162—5 |
| 3,081,219 | 3/1963 | Drennen | 162—168 X |

FOREIGN PATENTS 187,805  11/1922  Great Britain.

OTHER REFERENCES

West: Deinking of Paper, pp. 5 to 11, pub. by Institute of Paper Chemistry, Appleton, Wis., April 1943.

DONALL H. SYLVESTER, *Primary Examiner.*

HOWARD R. CAINE, *Examiner.*